United States Patent Office 3,408,678
Patented Nov. 5, 1968

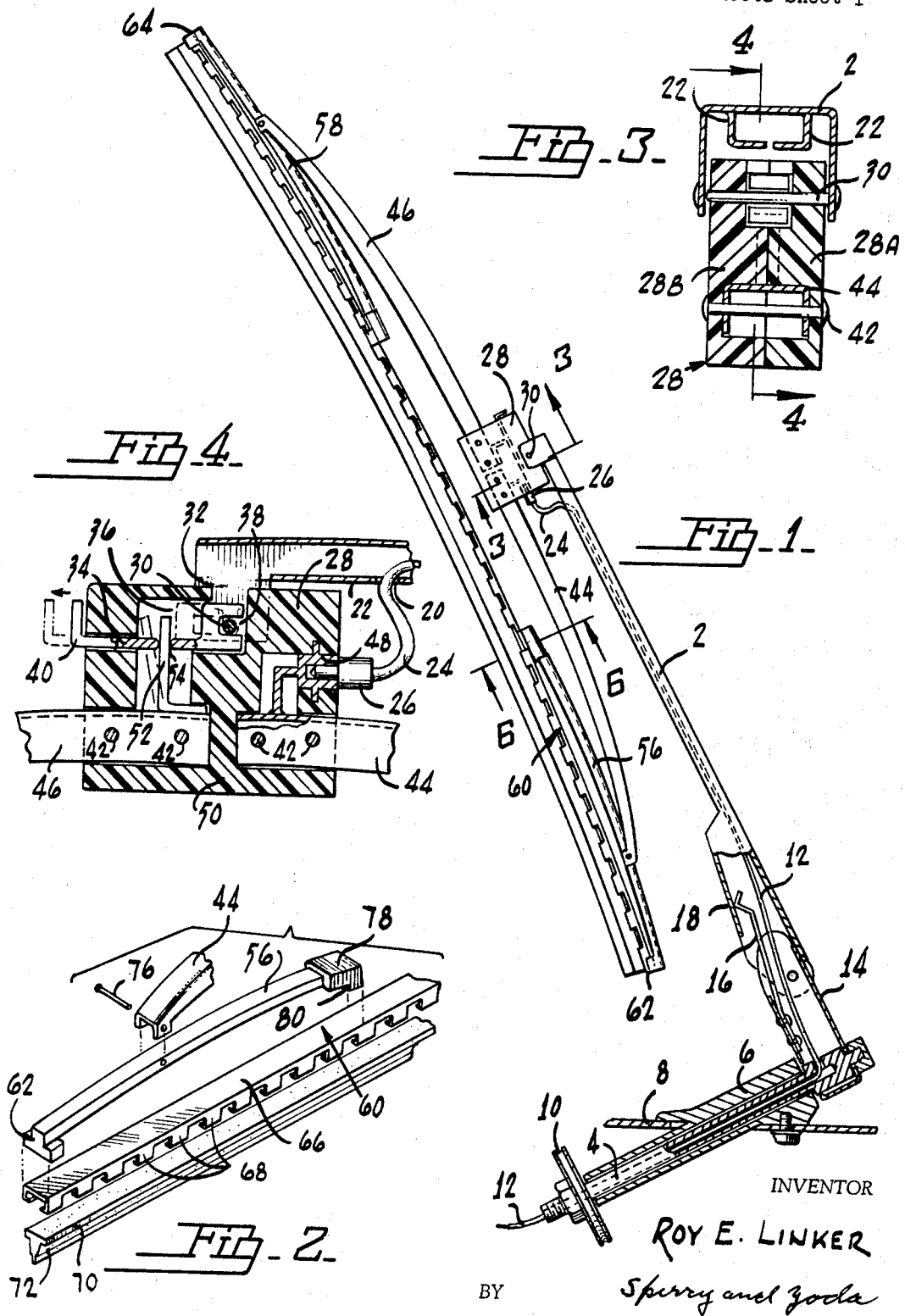

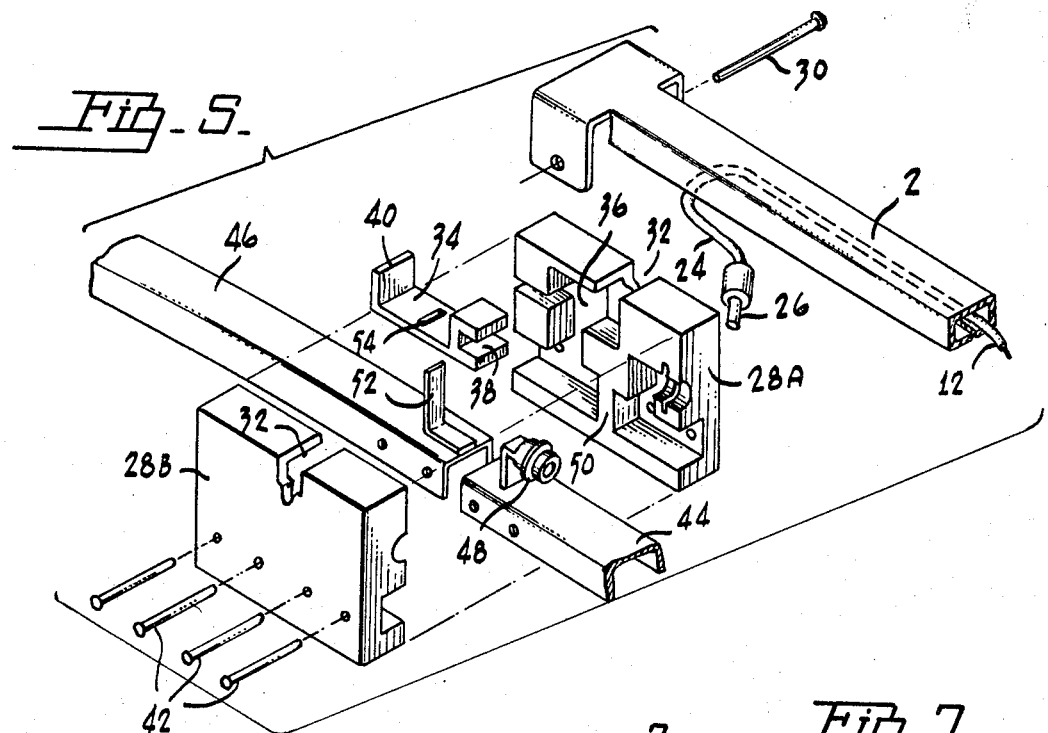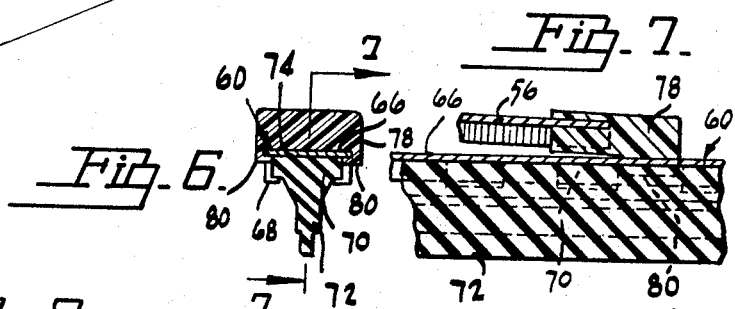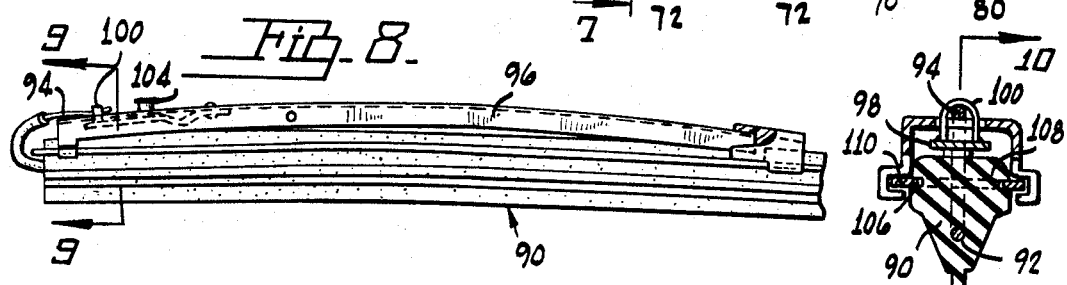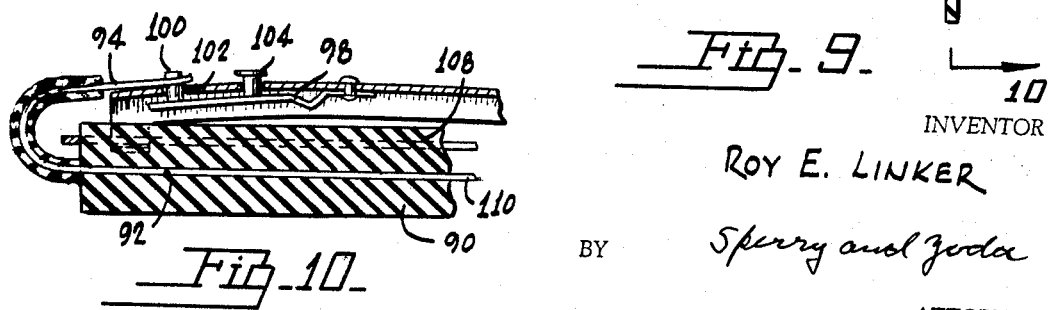

3,408,678
WINDSHIELD WIPER ASSEMBLY
Roy E. Linker, Nursery Road, Titusville, N.J. 08560
Filed Aug. 17, 1966, Ser. No. 573,109
8 Claims. (Cl. 15—250.05)

ABSTRACT OF THE DISCLOSURE

An electrically heated windshield wiper assembly comprising an arm movable over a windshield and having two oppositely extending blade supporting members carried thereby. The blade supporting members are formed of electrically conducting material and are electrically insulated one from the other. A windshield wiper blade is operably connected to the blade supporting members and is provided with an electrical resistance element for raising the temperature of the windshield wiper blade. Current is supplied to the electrical resistance element by connections between the blade supporting members and the opposite ends of the electrical resistance element.

---

This invention relates to electrically heated windshield wiper assemblies and to means for mounting and supplying current to a heating element thereof.

Numerous patents relating to electrically heated windshield wipers have been granted heretofore, as exemplified by applicant's issued Patent No. 3,201,818. Such constructions are designed to aid in melting snow, ice or frost on a windshield and to reduce the fogging of the windshield. One of the difficulties encountered in applying and utilizing such constructions arises from the fact that no generally acceptable means has been available for supplying current to the heating element while permitting ready attachment and detachment of the wiper blade and its mounting means or support so as to permit quick and easy replacement of the elements of such an assembly.

In accordance with the present invention improved means are provided for mounting a windshield wiper assembly, including the wiper blades and supporting means therefor as well as the electrical heating elements in such a way that the assembly can be quickly and easily removed for replacement or repair of any or all of the elements of the assembly.

In the preferred forms of the invention herein shown and described these advantages are attained by providing a windshield wiper assembly with releasable means which normally serve to hold the assembly and its electrical connections in substantially fixed and operative positions with respect to the wiper arm and windshield while permitting ready attachment and detachment of the various elements of the assembly and the current supplying connections thereof so that replacement of any one or more elements of the assembly can be made with a minimum of difficulty and expense.

Accordingly, the principal objects of the invention are to permit ready application and removal of electrically heated windshield wiper assemblies to the arm of a windshield wiper and to provide mounting means for such assemblies which may be utilized with various types of electrically heated wiper blades and supports.

These and other objects and features of the present invention will be apparent from the following description thereof wherein reference is made to the figures of the accompanying drawings.

In the drawings:

FIG. 1 is a side elevation, partly in section, illustrating a typical windshield wiper arm and blade supporting means together with suitable actuating means therefor;

FIG. 2 is an exploded view of a portion of a typical support and heating means for one form of windshield wiper blade;

FIG. 3 is a transverse sectional view through the mounting means for a windshield wiper blade support shown in FIG. 1 taken on the line 3—3 thereof;

FIG. 4 is a sectional view of the construction shown in FIG. 3 taken on the line 4—4 thereof;

FIG. 5 is an exploded view illustrating the elements of the mounting means of FIGS. 3 and 4 in disassembled relation;

FIG. 6 is a sectional view of the construction shown in FIG. 1 taken on the line 6—6 thereof;

FIG. 7 is a sectional view of the construction shown in FIG. 6 taken on the line 7—7 thereof;

FIG. 8 is a side elevation of a portion of an alternative embodiment of the present invention;

FIG. 9 is a transverse sectional view of the construction shown in FIG. 8 taken on the line 9—9 thereof; and FIG. 10 is a sectional view of the construction shown in FIG. 8 taken on the line 10—10 of FIG. 9.

In that form of the invention chosen for purposes of illustration in FIGS. 1 to 7 of the drawings, the construction embodies a wiper arm 2 secured to an oscillating shaft 4 mounted for movement within a tubular support 6 secured to the deck or other portion 8 of a car, truck, aircraft or the like. The shaft 4 may be oscillated by any suitable or conventional means such as a pulley 10, and is hollow or bored centrally to receive an electrical conductor 12 through which current may be supplied from any suitable source.

The wiper arm 2 is pivotally mounted on a bracket 14 carried by the shaft 4 and is urged toward the windshield (not shown) by means of a leaf spring 16 mounted on the bracket 14 and bearing against the portion 18 of the wiper arm. The conductor 12 which passes through the hollow shaft 4 extends from the shaft through the wiper arm to a point 20 near the free end of the arm. The arm 4 is preferably U-shaped in cross-section throughout the greater portion of the length thereof or is hollow or otherwise formed to house and protect the conductor 12 but is formed near the free end thereof with inwardly turned portions 22 as shown in FIGS. 3 and 4 to support and position the end 24 of the conductor to which a plug or other separable connector element 26 is secured.

The windshield wiper assembly carried by the arm 2 includes mounting means 28 which are normally secured to the wiper arm 2 near the free end thereof by means of an attaching pin 30. The attaching pin 30 extends through a recess 32 in the mounting means 28 and is held in place with respect to the mounting means by a latch member 34. The latch member 34 is slidably movable within a cavity 36 in the mounting means 28 and is formed on its inner end with a slot 38 which serves to embrace the pivot pin 30 so as to releasably secure the mounting means to the wiper arm 2. However, the latch member 34 is movable to the left as seen in FIG. 4 by means of a finger piece 40 carried by the latch member and exposed on the exterior of the mounting means 28 for releasing the mounting means from the wiper arm 2 when desired.

As shown in FIGS. 3 and 5, the mounting means 28 is preferably formed of two parts 28A and 28B which are secured together by means of pins, rivets or the like indicated at 42. The parts 28A and 28B are formed of insulating material such as Teflon or other plastic composition and have two oppositely extending supporting members 44 and 46 projecting therefrom and fixedly secured in position on the mounting means 28 by means of the pins or rivets 42. The supporting member 44 is designed to be electrically connected to the conductor 12 so as to serve as the positive current source of an electrical circuit for heating the windshield wiper. For this purpose, supporting member 44 is provided with a socket or other separable connecting means 48 adapted to receive the plug or connector 26, on the end 24 of the conductor 12. The oppositely extending supporting member 46 carried by the mounting means 28 is spaced, and electrically insulated, from the supporting member 44 by the portion 50 of the part 28A of the mounting means. A yieldable metal tongue 52 extends upwardly from the member 46 and projects through an opening 54 in a latch member 34 so as to urge the latch member inwardly into retaining engagement with the attaching pin 30 whereby the mounting means 28 and the oppositely extending supporting members 44 and 46 are normally secured in substantially fixed positions with respect to the wiper arm 2 of the assembly.

The oppositely extending supporting members 44 and 46 are formed of metal and are pivotally secured at their outer ends to arcuate metal pressure bars 56 and 58 respectively. The pressure bars 56 and 58 are in turn connected to the opposite ends of heating means 60 by connecting means 62 and 64 respectively whereby an electrical circuit for energizing the heating means 60 may be completed from the electrical conductor 12 through the separable connectors 26 and 48 to the supporting member 44 and through the pressure bar 56 to connector 62 at one end of the heating means 60. From the opposite end of the heating means 60 current flows through connector 64 and pressure bar 58 to the supporting member 56 and the yieldable metal tongue 52 and latch member 34 to attaching pin 30 connected to the wiper arm 2. The circuit is grounded through the wiper arm 2 and shaft 4 to the tubular support 6 and deck 8 of the car or truck. Therefore, whenever current is supplied to the conductor 12, a circuit will be completed through the heating element to ground to energize the heating element and serve to melt ice, snow or frost on the windshield while the windshield wiper arm and wiper blade are oscillated back and forth. The supply of current to conductor 12 can of course be controlled by any suitable means (not shown) such as a switch which may be located on the dash or elsewhere in a car.

When it is desired to remove the assembly, including the windshield wiper blade, heating means, supporting members and pressure bars from the wiper arm 2, it is only necessary to manipulate the finger piece 40 of the latch member 34 to disengage the attaching pin 30 carried by the wiper arm 2. The assembly will then be released from the wiper arm and the separable connector 26 on conductor 12 can be unplugged from connector 48 to permit change or replacement of the assembly or any of the various elements thereof.

The heating element 60 of the assembly, as shown in FIGS. 1, 2, 6 and 7 is in the form of a flat blade backing strip of material 66, which may be formed of "Nichrome" or other resistance type of alloy. The backing strip 66 is provided with spaced downwardly and inwardly turned fingers 68 designed to receive and embrace the head 70 of a windshield wiper blade 72. The upper, flat face of the head 74 of the wiper blade bears against or is otherwise heated by the lower surface of the backing strip 66. At the same time, the fingers 68 serve to hold the wiper blade in place although they permit insertion and removal of the wiper blade longitudinally of the heating element between the fingers when the blade is worn or needs replacement.

The electrical connecting means 62 and 64 on the outer ends of pressure bars 56 and 58 are frictionally pressed, clipped or otherwise connected to the ends of the heating element 60 whereas the pressure bars themselves are pivotally connected to the supporting members 44 and 46 by pins 76 so that the assembly and pressure bars may tilt to permit the wiper blade 72 to be urged into positive wiping contact with a curved windshield throughout the length of the blade as is usual in such constructions. However, the inner ends of the pressure bars 56 and 58 are provided with electrical insulating heads 78 to prevent short circuiting of any portion of the heating element 60. If desired, the head 78 may be formed with side portions 80 as shown in FIG. 6 which are slotted to receive and positively embrace the backing strip 66 and fingers 68 of the heating element 60 to aid in pressing and holding the heating element in engagement with the flat face 74 of the head 78 of the wiper blade 72. In this way, the pressure bars 56 and 58 not only serve to urge the wiper blade against the surface of the windshield throughout the length of the blade, but also serve to urge the heating element into engagement with the blade so as to assure substantially uniform and continuous heating of the blade throughout its length. Nevertheless, if it is desired to remove and replace the wiper blade 72 from the heating element 60, one or both of the electrical connectors 62 and 64 on pressure bars 56 and 58 can be disconnected to allow a new wiper blade to be slipped into place without removing other elements of the assembly.

The composition of the wiper blade 72 may of course be varied as desired but preferably is formed of a relatively soft or yieldable plastic material which has a melting or softening point which is high enough to prevent deterioration thereof under the influence of the heat generated by the heating element 60. At the same time, the composition should be such as to have sufficient heat conductivity to cause the temperature of the free or wiping edge 82 thereof to melt ice and snow which have accumulated on a windshield. On the other hand, the inwardly turned fingers 68 of the heating element 60 also serve to cause the snow and ice to melt by the action of radiant heat therefrom as the wiper is in use.

In the alternative embodiment of the invention shown in FIGS. 8, 9 and 10 of the drawings, the windshield wiper blade 90 is of the extruded type shown and described in applicant's issued Patent No. 3,201,818 wherein a heating element 92 extends throughout the length of the wiper blade and has the opposite ends thereof extended beyond the body of the blade 90 to provide leads 94 for connection with the pressure bars. The leads 94 may be electrically connected to the pressure bars in any desired manner but as shown in FIGS. 9 and 10, the pressure bar 96 has a leaf spring 98 carried thereby and normally urged toward the wiper blade 90. A retaining loop 100 is carried by the leaf spring and projects through an opening 102 in the pressure bar. A finger piece 104 on the leaf spring 98 also projects through the pressure bar so as to permit the loop 100 to be raised to receive the lead 94. When the finger piece is released, the leaf spring 98 and loop 100 move inward to hold the lead 94 in contact with and electrically connected to the pressure bar 96 for completing a circuit through the pressure bar and heating element 92.

Further as shown in FIG. 9, the wiper blade 90 may be provided with longitudinally extending grooves 106 in the opposite sides of the head 108 of the wiper blade for receiving a slotted backing or supporting strip 110 to prevent lateral displacement of the wiper blade with respect to the pressure bar and means by which it is mounted.

The construction shown in FIGS. 8, 9 and 10 thus permits ready detachment and attachment of the wiper blade from the assembly for replacement when desired without removal or detachment of the other elements of the assembly. At the same time, the entire assembly may be removed from the wiper arm as described in connection with that form of the invention illustrated in FIGS. 1 to 7.

While typical and preferred embodiments of the invention have been illustrated in the drawings and described above, it will be apparent that numerous changes in the form, construction and arrangement of the various elements of the combination may be made as desired for any particular assembly thereof. It should, therefore, be understood that the particular forms of the invention shown and described are intended to be illustrative only and are not intended to limit the scope of the invention.

I claim:

1. An electrically heated windshield wiper comprising an arm movable across a windshield, an electrical conductor carried by said arm and having a separable connector thereon located near the free end of said arm, mounting means detachably connected to said arm near said free end thereof and having a complementary separable connector thereon for detachable connection with the separable connector on said electrical conductor, electrically conducting supporting members carried by said mounting means and connected to said conductor and arm, a windshield wiper blade operatively connected to said supporting members, a resistance element in heat exchanging relation with said wiper blade, and electrical connecting means located adjacent the opposite ends of said resistance element and electrically connected to said supporting members to complete an electrical circuit through said heating element.

2. An electrically heated windshield wiper as defined in claim 1 wherein said mounting means and arm are separably connected by means of a manually operable latching device.

3. An electrically heated windshield wiper as defined in claim 2 wherein said supporting members are electrically insulated from each other and extend in opposite direction from said mounting means, one of said supporting members having said complementary separable connector carried thereby and the other of said supporting members being electrically connected to said arm through said latching device.

4. An electrically heated windshield wiper as defined in claim 1 wherein said supporting members each has a metallic pressure bar carried thereby and provided with detachable means thereon for electrically connecting one end of one of said pressure bars to one end of said heating element and for electrically connecting the opposite end of the other pressure bar to the opposite end of said heating element.

5. An electrically heated windshield wiper as defined in claim 1 wherein said wiper blade is separable from said heating element for removal and replacement of said wiper blade.

6. An electrically heated windshield wiper as defined in claim 1 wherein said wiper blade and heating element are separable from said supporting members for removal and replacement thereof.

7. An electrically heated windshield wiper assembly comprising an arm movable across a windshield mounting means carried by said arm, two oppositely extending electrically conducting blade supporting members carried by said mounting means, said blade supporting members being electrically insulated one from the other, a windshield wiper blade operatively connected to said blade supporting members, an electrical resistance element in heat exchanging relation with said wiper blade, means electrically connecting one end of said resistance element to one of said electrically conducting blade supporting members, means electrically connecting the opposite end of said resistance element to the other of said electrically conducting blade supporting members, and means including said blade supporting members for completing an electrical circuit through said resistance element to heat said element.

8. An electrically heated windshield wiper assembly as defined in claim 7 wherein said arm has an electrical conductor carried thereby and connected to one of said blade supporting members, the other blade supporting member being grounded through said arm.

References Cited

UNITED STATES PATENTS

| | | | |
|---|---|---|---|
| 2,869,166 | 1/1959 | Eaves | 15—250.07 |
| 2,755,499 | 7/1956 | Mays | 15—250.06 |
| 3,195,161 | 7/1965 | Haluck et al. | 15—250.06 |
| 3,201,818 | 8/1965 | Linker | 15—250.06 |

PETER FELDMAN, *Primary Examiner*